United States Patent Office 3,452,057
Patented June 24, 1969

3,452,057
2-HYDROXY METHYLENEANDROSTANES AND ESTERS THEREOF
Howard J. Ringold and George Rosenkranz, Mexico City, Mexico, assignors, by mesne assignments, to Syntex Corporation, a corporation of Panama
No Drawing. Continuation-in-part of application Ser. No. 632,016, Jan. 2, 1957. This application Jan. 21, 1960, Ser. No. 3,746
Claims priority, application Mexico, Dec. 17, 1956, 46,587; Aug. 30, 1957, 48,697
Int. Cl. C07c *169/22, 169/20, 169/24*
U.S. Cl. 260—397.4         9 Claims

ABSTRACT OF THE DISCLOSURE

Novel compounds of the formula:

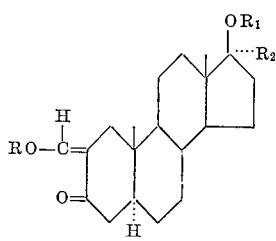

wherein each of R and $R_1$ is hydrogen or a hydrocarbon carboxylic acyl group and $R_2$ is hydrogen or lower alkyl. These compounds are orally active androgenic hormones having anabolic activity.

---

This application is a continuation-in-part of our copending applications Ser. No. 632,016 filed Jan. 2, 1957, and Ser. No. 757,923, filed Aug. 29, 1958 which in turn is a continuation-in-part of our copending application Ser. No. 636,860, filed Jan. 29, 1957, these three applications now being abandoned.

The present invention relates to cyclopentanophenanthrene compounds and to a novel process for the production thereof.

More particularly the present invention relates to the production of novel anabolic agents having a steroid nucleus and at C–2 a hydroxymethylene moiety as well as esters and ethers thereof. The novel anabolic agents of the present invention may be characterized by the following formula:

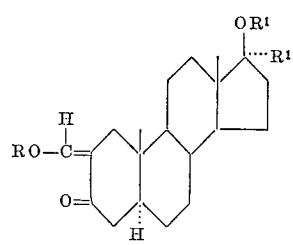

In the above formula R represents hydrogen, lower alkyl, such as methyl, ethyl, propyl or isopropyl, or aralkyl, such as benzyl or R may represent an ester group preferably a residue of a hydrocarbon carboxylic acid of less than 12 carbon atoms of the character well known in the steroid art. These ester groups may be saturated or unsaturated, aliphatic, aromatic, cyclic and may be substituted by, for example, halogen. Typical ester groups are benzoate, phenoxyacetate, acetate, propionate, caproate, enanthate, cyclopentylpropionate, etc. $R_1$ may be hydrogen or an ester group of the same type as R. $R_2$ represents hydrogen or a lower alkyl group such as methyl, ethyl, propyl or butyl.

In accordance with the present invention it has been discovered that compounds of the above character are valuable androgenic type hormones having a very pronounced anabolic effect and are especially desirable for administration to humans and/or animals by the oral route. It has further been discovered that these compounds may be prepared by a novel process involving treatment of the corresponding steroid compounds unsubstituted at C–2 with ethyl formate followed, if the ethers or esters are desired, by conventional esterification or etherification steps.

The process of the present invention may therefore be illustrated by the following equation:

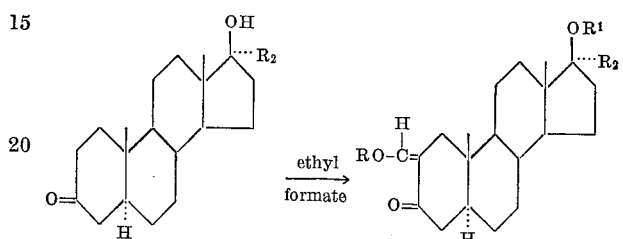

In the above formula R, $R_1$ and $R_2$ represent the same groups as heretofore set forth. As may be understood the groups indicated by R and $R_1$ result from conventional esterification or etherification of the novel intermediates, namely 2-hydroxymethylene 17α-lower alkyl derivatives of androstan-17β-ol-3-one as will be hereinafter set forth in detail.

In practicing the process outlined above dihydrotestosterone or a 17α-lower alkyl derivative of dihydrotestosterone (androstan-17β-ol-3-one), was mixed with an inert organic solvent such as benzene, toluene, tertiary butyl alcohol or dioxane and with ethyl formate and alkali metal hydride or alkali metal alkoxide and allowed to stand at room temperature for a period of time of the order of 5 to 24 hours. The precipitate, a mixture of the alkali metal salt of the desired 2-hydroxymethylene derivative and excess alkali metal compound was then treated with mineral acid such as hydrochloric acid in water to precipitate the 2-hydroxymethylene derivative which was then purified.

Formation of the 2-mono esters of the 2-hydroxymethylene derivatives having a secondary or tertiary hydroxyl group at C–17 is effected by adding the appropriate acid chloride to the 2-hydroxymethylene derivative in dilute aqueous sodium hydroxide. To form the 2-mono esters when $R^2$ is alkyl, the 2-hydroxymethylene derivative can also be reacted in a conventional manner with the corresponding acid anhydride or chloride in pyridine solution at room temperature, when the diester is desired the compound is refluxed with an excess of acid anhydride in pyridine solution. There may also be prepared mixed esters wherein R and $R_1$ are different acyl groups by further reaction of the 2-mono esters with a different acid anhydride under reflux conditions.

For the preparation of the 2-ether derivatives i.e. where R represents lower alkyl or aralkyl the free compound was refluxed with the corresponding alkyl halide in an inert organic solvent such as acetone and a base such as potassium carbonate.

The following specific examples serve to illustrate but are not intended to limit the invention.

EXAMPLE I

A mixture of 20 g. of 17α-methyl-dihydrotestosterone, 250 cc. benzene, 20 cc. of ethyl formate and 3 g. of sodium hydride was kept for one day at room temperature under an atmosphere of nitrogen. The precipitate was filtered, washed with benzene, then hexane and dried in vacuo. The dried powder was added in portions with stirring to a cold solution of 50 ml. of concentrated hydrochloric acid in 500 ml. of water. The mixture was stirred for 30 minutes, the precipitate filtered, washed with water, dried and crystallized from ethyl acetate to give 2-hydroxymethylene derivative of 17α-methyl-dihydrotestosterone (17α-methyl-androstan-17β-ol-3-one).

EXAMPLE II

By the procedure of Example I from the 17α-lower alkyl derivatives (ethyl or propyl) of dihydrotestosterone (androstan-17β-ol-3-one), there was prepared the corresponding 17α-ethyl and propyl 2-hydroxymethylene derivatives.

EXAMPLE III 1 g. of 2-hydroxymethylene-17α-methyl-dihydrotestosterone was dissolved in 20 cc. of 3% aqueous sodium hydroxide solution, cooled to 10° C. and then mixed with benzoyl chloride dropwise until the solution had a weakly acidic reaction, while the mixture was vigorously stirred. After diluting with water the product was extracted with ether, washed with water, dried over anhydrous sodium sulfate, filtered and evaporated to dryness. The residue crystallized from acetone-hexane to give 2-benzoxymethylene-17α-methyl-dihydrotestosterone.

EXAMPLE IV

A solution of 1 g. of 2-hydroxymethylene-17α-methyl-dihydrotestosterone in 10 cc. of pyridine was treated with 1 cc. of propionic anhydride and the mixture was kept at room temperature overnight. After pouring into water, the resulting suspension was heated for half an hour on the steam bath and cooled; the precipitate was collected, washed with water, and dried. Crystallization from acetone-hexane afforded the 2-monopropionate of 2-hydroxymethylene-17α-methyl-dihydrotestosterone, namely 2-propionoxy-methylene-17α-methyl - androstan-17β-ol-3-one.

EXAMPLE V

When in the previous example the propionic anhydride was substituted by 1.1 molar equivalents of propionyl chloride, the final product obtained was the same. By the same methods as this example and that of Example IV, using other corresponding anhydrides or chlorides, there were prepared the corresponding 2-cyclopentylpropionates 2-acetates and 2-benzoates of all of the compounds prepared according to Examples I and II.

EXAMPLE VI

A mixture of 2-hydroxymethylene-17α-ethyl-dihydrotestosterone, 10 cc. of pyridine and 2 cc. of acetic anhydride was refluxed for 12 hours and then poured into ice water. The product was extracted with ethyl acetate, the extract was washed with dilute hydrochloric acid, 5% sodium carbonate solution and with water to neutral, dried over anhydrous sodium sulfate and evaporated to dryness. Recrystallization of the residue from acetone-hexane yielded the diacetate of 2-hydroxymethylene-17α-ethyl-dihydrotestosterone, namely 2-acetoxymethylene-17α-ethyl-17α-acetoxy-androstan-3-one. By the same method, using corresponding acid anhydrides or chlorides there were prepared the 2,17 dipropionate, 2,17-dibenzoate and 2,17-dicyclopentylpropionate of all of the compounds of Examples I and II.

EXAMPLE VII 1 g. of 2-benzoxymethylene-17α-methyl-dihydrotestosterone obtained in accordance with Example III was dissolved in 10 cc. of pyridine and mixed with 2 cc. of propionic anhydride. The mixture was refluxed and worked up as in Example VI to give 2-benzoxymethylene-17β-propionoxy-17α-methyl-dihydrotestosterone. By the same method using the corresponding anhydride there were prepared the 2-benzoxymethylene-17β-acetoxy, the 2-benzoxymethylene-17β-cyclopentylpropionoxy and other mixed esters of the compounds of Examples I and II.

EXAMPLE VIII

A mixture of 1 g. of 2-hydroxymethylene-17α-methyl-dihydrotestosterone, 50 cc. of absolute methyl iodide, 50 cc. of anhydrous acetone and 1 g. of anhydrous powdered potassium carbonate was refluxed for 48 hours and then poured into water. The product was extracted with ether, the extract was washed with water, dried over anhydrous sodium sulfate and evaporated to dryness. The residue was purified by chromatography on washed alumina thus giving 2-methoxymethylene - 17α - methyl-dihydrotestosterone. The same method applied to the other 2-hydroxymethylene derivatives of Example II gave corresponding 2-methoxy methylene compounds.

EXAMPLE IX 1 g. of 2-hydroxymethylene-17α-propyl-dihydrotestosterone was dissolved in 50 cc. of absolute n-propyl iodide and 50 cc. of anhydrous acetone, mixed with 1 g. of powdered anhydrous potassium carbonate and the mixture was refluxed for 48 hours. After pouring into water, the product was extracted with ethyl acetate, the extract was washed with water, dried over anhydrous sodium sulfate, filtered and evaporated to dryness. The residue crystallized from acetone-hexane to yield 2-propoxy-methylene-17α-propyl-dihydrotestosterone. The same method applied to the other 2-hydroxymethylene derivatives of Examples I and II gave corresponding 2-propoxy compounds.

EXAMPLE X

A mixture of 20 g. of dihydrotestosterone, 250 cc. of benzene, 20 cc. of ethyl formate and 3 g. of sodium hydride was kept for one day at room temperature under an atmosphere of nitrogen. The excess of hydride was decomposed by the cautious addition of methanol and then diluted with 200 cc. of water. The aqueous layer was separated, washed with ether, acidified and dilute hydrochloric acid and extracted with methylene chloride. The methylene chloride solution was evaporated to dryness and the residue crystallized from acetone-hexane to produce 2-hydroxymethylene-dihydrotestosterone.

By conventional methods, as previously set forth, in Example VI, there was prepared the di-acetate, di-propionate, di-cyclopentylpropionate and di-benzoate of 2-hydroxymethylene androstan-17β-ol-3-one and by the method set forth in Example III, there were prepared the 2-acetate, 2-propionate, 2-benzoate and 2-cyclopentylpropionate of 2-hydroxymethylene androstan-17β-ol-3-one.

In our U.S. Patent 2,908,693, granted Oct. 13, 1959, there is disclosed another method for preparing 2-hydroxymethylene - dihydrotestosterones, 2 - methyldihydrotestosterones and the 17α-lower alkyl derivatives thereof.

We claim:
1. A compound of the following formula:

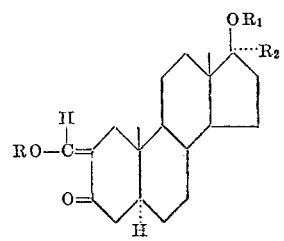

wherein R is selected from the group consisting of hydrogen, and hydrocarbon carboxylic acyl of less than 12 carbon atoms, $R_2$ is selected from the group consisting of hydrogen and lower alkyl, and $R_1$ is selected from the group consisting of hydrogen and a hydrocarbon carboxylic acyl group of less than 12 carbon atoms.

2. A compound of the following formula:

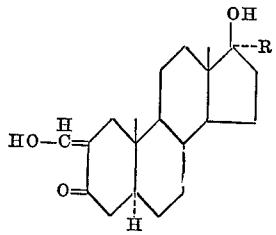

wherein R is selected from the group consisting of hydrogen and lower alkyl.

3. 2 - hydroxymethylene - 17α - lower alkyl - androstan-17β-ol-3-one.

4. The 2-monoesters of hydrocarbon carboxylic acids of less than 12 carbon atoms of 2-hydroxymethylene-17α-lower alkyl-androstan-17β-ol-3-one.

5. The 2,17-diesters of hydrocarbon carboxylic acids of less than 12 carbon atoms of 2-hydroxymethylene-17α-lower alkyl-androstan-17β-ol-3-one.

6. 2 - hydroxymethylene - 17α - methyl - androstan-17β-ol-3-one.

7. 2-hydroxymethylene-androstan-17β-ol-3-one.

8. The 2,17-diesters of hydrocarbon carboxylic acids of less than 12 carbon atoms of 2-hydroxymethylene-androstan-17β-ol-3-one.

9. The 2-monoesters of hydrocarbon carboxylic acids of less than 12 carbon atoms of 2-hydroxymethylene-androstan-17β-ol-3-one.

References Cited
UNITED STATES PATENTS

| | | | |
|---|---|---|---|
| 2,281,622 | 5/1942 | Ruzicka | 260—397.1 |
| 2,883,401 | 4/1959 | Babcock et al. | 260—397.45 |

HENRY A. FRENCH, *Primary Examiner.*

U.S. Cl. X.R.

260—999